(12) United States Patent
Reddy

(10) Patent No.: US 6,910,283 B1
(45) Date of Patent: Jun. 28, 2005

(54) METHOD AND SYSTEM FOR HEAT RECOVERY IN A THROUGHDRYING TISSUE MAKING PROCESS

(75) Inventor: Kiran K. Reddy, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/742,625

(22) Filed: Dec. 19, 2003

(51) Int. Cl.$^7$ ................................. F26B 3/00
(52) U.S. Cl. ................ 34/446; 34/122; 34/456; 162/207
(58) Field of Search ............ 34/446, 456, 458, 34/115, 122, 618; 162/207, 109

(56) References Cited

U.S. PATENT DOCUMENTS

| | | |
|---|---|---|
| 3,432,936 A | 3/1969 | Cole et al. |
| 3,686,903 A | 8/1972 | Fleissner |
| 4,157,938 A | 6/1979 | Clemens et al. |
| 4,192,711 A | 3/1980 | Tapio et al. |
| 4,242,808 A | 1/1981 | Luthi |
| 4,622,758 A | 11/1986 | Lehtinen et al. |
| 4,780,967 A | 11/1988 | Mucic |
| 4,932,424 A | 6/1990 | Liebe et al. |
| 4,974,338 A | 12/1990 | Banford et al. |
| 4,977,687 A | 12/1990 | Boissevain |
| 5,042,373 A | 8/1991 | Fenzau et al. |
| 5,105,558 A | 4/1992 | Curry |
| 5,210,958 A | 5/1993 | Bond et al. |
| 5,282,323 A | 2/1994 | Winheim |
| 5,553,392 A | 9/1996 | Hanaya |
| 5,588,223 A | 12/1996 | Marshall |
| 5,619,806 A | 4/1997 | Warren |
| 5,647,141 A | 7/1997 | Hanaya |
| 5,653,043 A | 8/1997 | Bestwick et al. |
| 5,845,415 A | 12/1998 | Sundqvist |
| 5,865,955 A | 2/1999 | Ilvespaa et al. |
| 5,974,691 A | 11/1999 | Marchal et al. |
| 6,149,767 A | 11/2000 | Hermans et al. |
| 6,331,230 B1 | 12/2001 | Hermans et al. |
| 6,551,461 B2 * | 4/2003 | Leitner et al. ............... 162/207 |
| 6,631,566 B2 * | 10/2003 | Ross et al. ..................... 34/445 |
| 6,732,452 B2 | 5/2004 | Lin et al. |

OTHER PUBLICATIONS

US 6,134,809, 10/2000, Stipp (withdrawn)

* cited by examiner

*Primary Examiner*—Stephen Gravini
(74) *Attorney, Agent, or Firm*—Dority & Manning

(57) ABSTRACT

A throughdrying process and system for the manufacture of a tissue web conveys a fibrous web of cellulose fibers through a throughair drying station that includes one or more throughair dryers. The throughair drying station is supplied with a heated drying medium from a source. After drying the web, the drying medium is conducted away from the throughair drying station as moisture laden exhaust air that is collected, dried, and at least partially recirculated back to the throughair drying station as a supplement to the source of heated drying medium, thereby reducing the load on the heated drying medium source.

41 Claims, 4 Drawing Sheets

METHOD AND SYSTEM FOR HEAT RECOVERY IN A THROUGHDRYING TISSUE MAKING PROCESS

FIELD OF THE INVENTION

The present invention relates generally to the field of tissue product manufacturing, and more particularly to a throughdrying manufacturing process.

BACKGROUND

There are many characteristics of tissue products such as bath and facial tissue that must be considered in producing a final product having desirable attributes for the product's intended purpose. Improved softness of the product has long been one major objective, particularly for the success of premium products. In general, the components of "softness" include stiffness and bulk (density), with lower stiffness and higher bulk (lower density) generally improving perceived softness. While enhanced softness is generally desirable for all types of tissue products, it has been especially challenging to achieve.

The throughdrying process is well known in the art and is used extensively in the manufacture of all types of tissue products having desirable softness characteristics. Throughdrying provides a relatively noncompressive method of removing water from a web by passing hot air through the web until it is dry. More specifically, a wet-laid web is transferred from the forming fabric to a coarse, highly permeable throughdrying fabric and retained on the throughdrying fabric until dry. The web is typically conveyed on the fabric through passage of one or more throughair dryers ("TAD") where the web is dried to its final dryness state. The resulting dried web is typically softer and bulkier than a conventionally dried uncreped sheet because fewer bonds are formed in the web and the web is less compressed. Such throughdrying processes are described in detail, for example, in U.S. Pat. Nos. 6,149,767 and 6,331,230 B1.

However, from a manufacturing perspective, the throughdrying process is relatively energy intensive and therefore expensive compared to conventional wet pressing processes. The energy consumption issue is compounded by the fact that a significant amount of heat is vented to atmosphere during the process and, thus, wasted.

The present invention relates to an improvement in throughdrying processes that will significantly enhance the energy efficiency of such processes.

SUMMARY

Objects and advantages of the invention will be set forth in part in the following description, or may be obvious from the description, or may be learned through practice of the invention.

The present invention provides a throughdrying process and system for the manufacture of a tissue web wherein a web of cellulose fibers is conveyed through a drying station that includes one or more throughair dryers. The throughair drying station is supplied with a heated drying medium from a source, such as a fuel or electric burner unit. After drying the web, the drying medium is conducted away from the throughair drying station as moisture laden exhaust air. This exhaust air contains a substantial amount of thermal energy and, instead of being vented, at least a portion is collected, dried, and recirculated back to the throughair drying station as a supplement to the source of heated drying medium, thereby significantly reducing the load on the burner unit or drying medium source.

It should be appreciated the system and process according to the invention may be utilized in any throughdrying process, and are not limited to any particular component configuration within the process line. Various throughdrying process lines are well known to those skilled in the art, and the present invention will provide advantages to all such lines.

In a particular embodiment, a closed-loop recirculation path is provided for the moisture laded exhaust air from the throughair drying station. In this loop, the exhaust air is conveyed through a dryer wherein the moisture is removed from the exhaust air. This dryer may take on various configurations. In one particular configuration, the dryer defines a tower or column-like component containing relatively small particles of a drying substrate. The exhaust air is conveyed through the dryer and mixes directly with the particles, resulting in a fluidized bed of drying particles. The drying particles may be any suitable substrate, including silica gel, silica based artificial zeolites, ceramic beads, or polymer based moisture absorbing substrates, that absorbs moisture from the exhaust air stream.

The dryer may also serve to remove odors from the exhaust stream. This may be accomplished, for example, by mixing odor absorbing particles with the drying particles in a ratio that results in a desired degree of odor absorbing capacity without detrimentally affecting the drying capacity. Such odor absorbing particles may be, for example, activated carbon, natural zeolites, and so forth.

A portion of the fluidized drying particles are carried in the recirculating exhaust air stream exiting from the dryer. In this regard, the recirculation path may also include a separating station downstream from the dryer to separate the drying particles from the exhaust air stream. The separation station may include any suitable separators for removing particulates from an airstream. In a particular embodiment, the separators may be one or more serially arranged cyclone separators. For example, a coarse separator may be provided followed by a fine separator.

A regeneration loop may be provided to receive the moisture laden drying particles from the separation station, dry the particles, and return the particles to the dryer. For this purpose, the regeneration loop may include a heating device through which the particles are conveyed. The heating device may be, for example, a heat exchanger supplied with a heated medium that heats and causes the particles to release any retained moisture. The heating device may also be provided with a supply of air for removing the released moisture from the device. In a particularly efficient configuration, the heating device is supplied with a portion of the heated drying medium from the burner.

The moisture laded air from the heating device (which may be superheated steam) may be used in other process applications in the mill. In a particular embodiment, a compressor is disposed downstream of the heating device and converts the moisture laden air from the heating device into saturated steam for use in various other processes in the mill.

After the drying particles have been heated in the heating device, they must be cooled prior to being reintroduced into the dryer. The regeneration loop may include a cooling device for this purpose, such as a counter-flow tower-type heat exchanger to which the particles are conveyed and allowed to fall by gravity against the counter flow of a cooling medium, such as atmospheric air. The cooling medium is thus heated in the exchanger and may be directed to other uses. In a particular embodiment, the heated cooling medium is supplied as intake air to the burner, thus further reducing the load on the burner.

Aspects of the invention will described below in greater detail by reference to particular embodiments, examples of which are illustrated in the figures.

DETAILED DESCRIPTION

The invention will now be described in detail with reference to particular embodiments thereof. The embodiments are provided by way of explanation of the invention, and are not meant as a limitation of the invention. For example, features described or illustrated as part of one embodiment may be used with another embodiment to yield still a further embodiment. It is intended that the present invention include these and other modifications and variations as come within the scope and spirit of the invention.

As mentioned, the present invention provides a throughdrying process and system offering significant savings in energy consumption per ton of material produced through the processing line. The system and method according to the invention are not limited to any particular throughdrying process line configuration. Various line configurations are described, for example, in U.S. Pat. Nos. 6,149,767 and 6,331,230, such patents being incorporated herein by reference in their entirety for all purposes. For example, the cited patents describe a throughdrying processing line incorporating a signal throughair dryer, as well as a processing line incorporating at least two serially arranged throughair dryers.

Throughdrying processing machinery and techniques are well understood by those skilled in the art, and a detailed explanation of such systems and general processes is not necessary for an understanding or appreciation of the present invention. However, for purposes of general background information, a throughdrying processing line is illustrated in FIG. 1.

Figure 1:
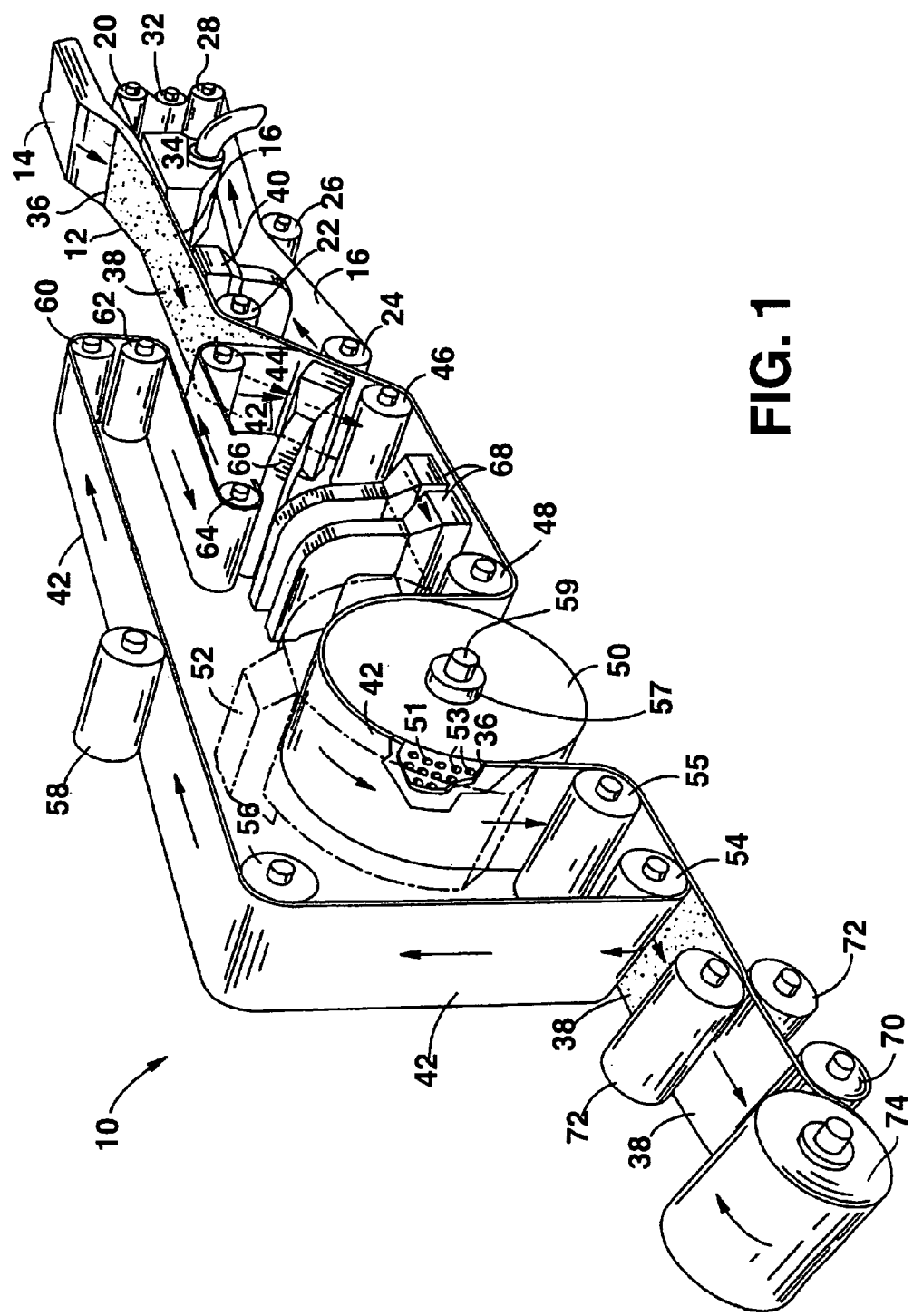
FIG. 1 is a perspective view of a throughdrying process line for producing a dried tissue product.

Referring to FIG. 1, an exemplary throughdrying process line is illustrated that may incorporate the features and advantages of the present invention. The process line 10 begins with a papermaking furnish 12 comprising a mixture of cellulosic fiber, water, and a chemical debonder which is deposited from a conventional headbox (not shown) to a nozzle 14 on top of a forming wire or belt 16. The forming belt 16 travels around a path defined by a series of guide rollers. In particular, the forming belt 16 travels from an upper guide roller 20 positioned below and proximate to the headbox nozzle 14, horizontally and away from the headbox nozzle 14 to another upper guide roller 22, through the upper guide roller 22 and downwardly to a lower guide roller 24. The forming belt 16 then passes under the lower guide roller 24 and upwardly toward the nozzle 14 to a lower guide roller 26, over the lower guide roller 26 and downwardly to a lower guide roller 28. The belt 16 passes under the lower guide roller 28 and turns upwardly to a guide roller 32, passes behind the guide roller 32 and returns to the upper guide roller 20.

A vacuum forming box 34 is positioned beneath the forming belt 16 proximate to the opening 36 of the headbox nozzle 14 and extracts moisture from the moist fibrous web 38 deposited onto the forming belt 16 by the headbox nozzle 14. The partially dewatered fibrous web is carried by the forming belt 16 towards the upper guide roller 22. As the web 38 moves away from the vacuum forming box 34, it may comprise from about 19 percent to about 30 percent cellulosic fiber by weight. An edge vacuum 40 positioned below the forming belt 16 and proximate to the upper guide roller 22 assists in trimming the edges of the fibrous web 38.

The fibrous web 38 passes over the upper guide roller 22 and downwardly between the forming belt 16 and a throughdryer belt 42. The throughdryer belt 42 travels around a path defined by a series of guide rollers. The belt 42 travels from a guide roller 44 positioned above and vertically offset from the guide roller 22 downwardly towards the forming belt 16, contacts the fibrous web 38, and then travels downwardly away from guide roller 24 to a guide roller 46, passes under guide roller 46 and turns away from the forming belt 16 towards a guide roller 48. The throughdryer belt 42 passes under the guide roller 48 and turns upwardly and over a throughair dryer 50, and downwardly to guide roller 55. The belt 42 passes under the guide rollers 55 and 54 and turns upwardly to a guide roller 56. The belt 42 passes around the roller 56, below the upper guide roller 58, around an upper guide roller 60, and under a guide roller 62. From the guide roller 62, the belt 42 turns away from the forming belt 16 to a guide roller 64, passes around the guide roller 64 and turns in the direction of the forming belt 16 and to the guide roller 44.

A vacuum pick-up 66 pulls the fibrous web 38 towards the throughdryer belt 42 and away from the forming belt 16 as the web 38 passes between the throughdryer belt 42 and forming belt 16. The fibrous web 38 adheres to and is carried by the throughdryer belt 42 downwardly below the lower guide roller 46 and towards the throughair dryer (TAD) 50. Vacuum boxes 68 positioned and proximate to the throughdryer belt 42 between the lower guide roller 46 and the throughdryer guide roller 44 extract additional water from the moist fibrous web 38. The fibrous web 38 may comprise between about 25 percent and about 35 percent fiber-by-weight after passing beneath the vacuum boxes 68.

The TAD 50 generally comprises an outer rotatable perforated cylinder 51 and an outer hood 52. The hood 52 is used to direct a heated drying medium from a drying medium supply duct and source (not illustrated) against and through the fibrous web 38 and throughdryer belt 42, as is known to those skilled in the art. The throughdryer belt 42 carries the fibrous web 38 over the upper portion of the throughdryer outer cylinder 51. The drying medium is forced through the web 38 and belt 42 and through the perforations 53 in the outer cylinder of the TAD 50. The drying medium removes the remaining water from the fibrous web 38 and exits the cylinder 51 via conduits (not illustrated) in proximity to outlets 57 positioned along the axis 59 of the cylinder 51. The temperature of the heated drying medium forced through the fibrous web 38 in the TAD is desirably about at least 300° F.

Throughdryer belt 42 carries the dried fibrous web 38 towards the lower guide roller 54. The dried web 38 is directed to a take-up roller 70 where the web 38 is wound into a product roll 74.

In the TAD 50, the heated drying medium raises the temperature of the web 38 as it passes through the web, thereby converting the water content of the web to steam. The steam is released from the web fibers/matrix and passes into the drying medium.

Figure 2:
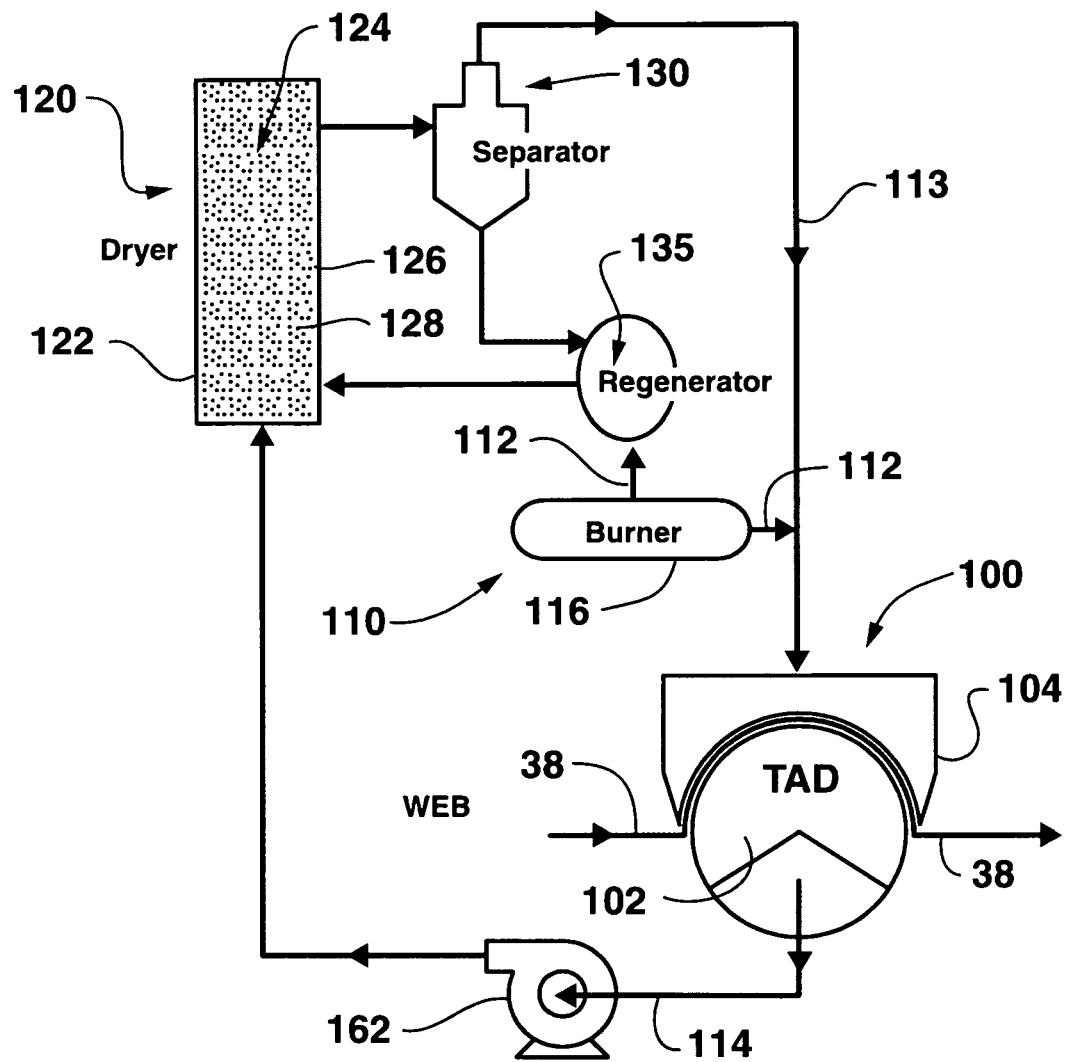
FIG. 2 is a schematic diagram of a recirculation process for use in a throughdrying process line having a single throughair dryer.
Figure 3:
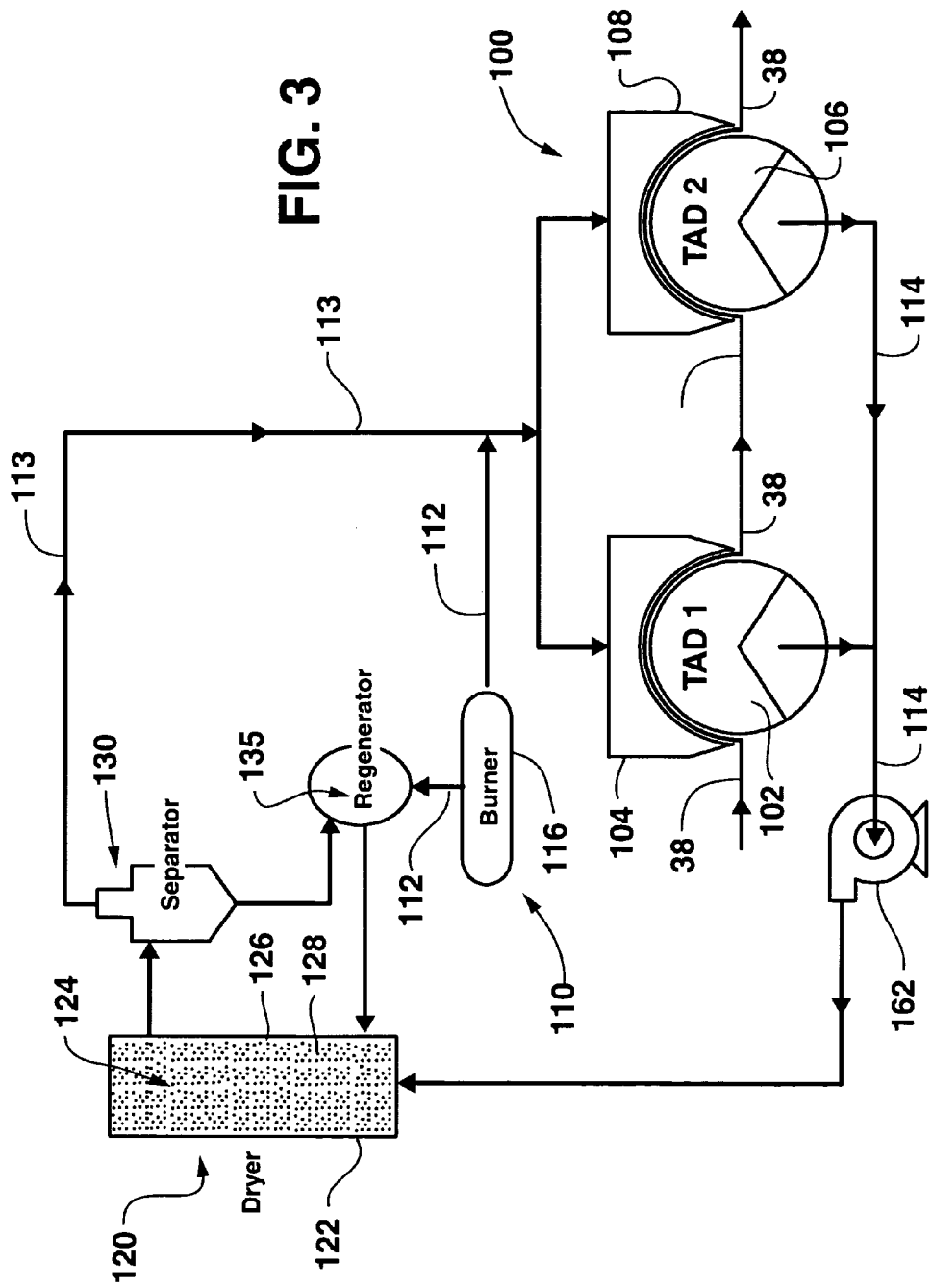
FIG. 3 is a schematic diagram of a recirculation process for use in a throughdrying process line having multiple throughair dryers.

FIGS. 2 and 3 are basic schematic diagrams illustrating certain principles and operational characteristics of embodiments of the method and system according to the invention. FIG. 2 illustrates a single TAD system, and FIG. 3 illustrates a system with two TADs serially arranged. The systems are otherwise similar. A throughair drying station 100 is supplied with a heated drying medium 112 from a source 110, such as a fuel or electric burner unit 116. The throughair drying station 100 may include one or more throughair dryers. For example, referring to FIG. 2, a single throughair dryer 102 is illustrated with a respective hood 104 into which the drying medium 112 is directed. From within the hood 104, the drying medium flows through the web 38 and perforated cylinder within the dryer 102, as discussed above with respect to FIG. 1. In the embodiment of FIG. 3, the throughair drying station 100 includes first and second throughair dryers 102, 106, with respective hoods 104, and 108. The throughair dryers 102, 106 are serially arranged such that the web 38 passes from the first throughair dryer 102 and then through the second throughair dryer 106.

The heated drying medium exits the throughair dryers 102 and 106 as moisture laden exhaust air 114. This exhaust air 114 is conducted away from the throughair dryers by any appropriate conduit system. A recirculation fan 162, or other motive force device, may be provided in-line to recirculate the exhaust air 114, as described herein.

The exhaust air 114 is conducted to a dryer unit 120. The dryer 120 may take on various configurations and include any number of known dryers for removing moisture from an air stream. In a particular embodiment, the dryer 120 consists of a tower-type structure containing a drying substrate in the form of small particles 126. As the exhaust air stream 114 is conveyed through the tower-like structure 122, the drying particles 128 are fluidized by the moving air such that a fluidized drying bed 124 is created within the dryer 122. The conditions within the dryer 120 will be a function of a number of variables. The temperature within the dryer 120 may be maintained within a range of about 150° to about 350° F. Relative humidity within the dryer 120 may be maintained between about 30 percent to 100 percent. Pressure may be maintained between about 0.8 to about 2.5 atmospheres. Finally, residence time of the drying particles 128 within the tower structure 122 may be within about 2 to about 18 minutes.

The drying particles 128 may be any one or combination of known substrates that are capable of absorbing moisture. The particles may be, for example, silica gel, silica based zeolites, ceramic beads, or any number of polymer based moisture absorbing substrates. The particle size will depend on the flow rate of the exhaust air 114 through the tower structure 122, desired residence time, absorption capability of the particles, and so forth, and may be empirically determined by those skilled in the art. In a particular embodiment, the particles have a diameter of between about 0.5 to about 15 mm.

It may also be desired to remove odors from the exhaust air stream 114. This may be accomplished by mixing odor absorbing particles 126 with the drying particles 128. Any number of odor absorbing substrates are known and may be used for this purpose, such as activated carbon particles, natural based zeolite particles, and so forth. A ratio by weight of the moisture absorbing particles 128 to the odor absorbing particles 126 may be in a range of from about 4:1 to about 10:1. The odor absorbing particles 126 may have a diameter of between about 0.5 to about 15 mm.

A substantial portion of the particles 128, 126 will be conveyed with the airstream 114 as it exits the dryer 120. In this regard, a separating station 130 may be provided downstream of the dryer 120 for removing the particles from the airstream. An embodiment of the separating station 130 will be described in greater detail below with reference to FIG. 4.

A regeneration loop or cycle 135 may also be provided to receive the drying particles 128 and odor absorbing particles 126 from the separation station 130. The regeneration loop 135 heats the particles 128 to release the retained moisture, cools the particles, and then conveys the particles back to the dryer 120. The regeneration loop 135 will also be explained in greater detail below with reference to FIG. 4.

The exhaust air leaves the separating station 130 as a dried supplemental heating medium 113. This medium 113 may be conducted directly to the throughair dryers as a supplement to the heated drying medium 112 from the burner 116. As discussed in greater detail below with respect to FIG. 4, a portion of the dried supplemental medium 113 may also be directed to the intake of the burner 116. Accordingly, it should be readily appreciated that the thermal energy within the moisture laden exhaust air 114 is eventually used to supplement the heated drying medium 112 conducted into the throughair dryers 102, 106 and, thus, significantly reduces the load on the heat source 110 used to generate the heated drying medium 112.

Figure 4:
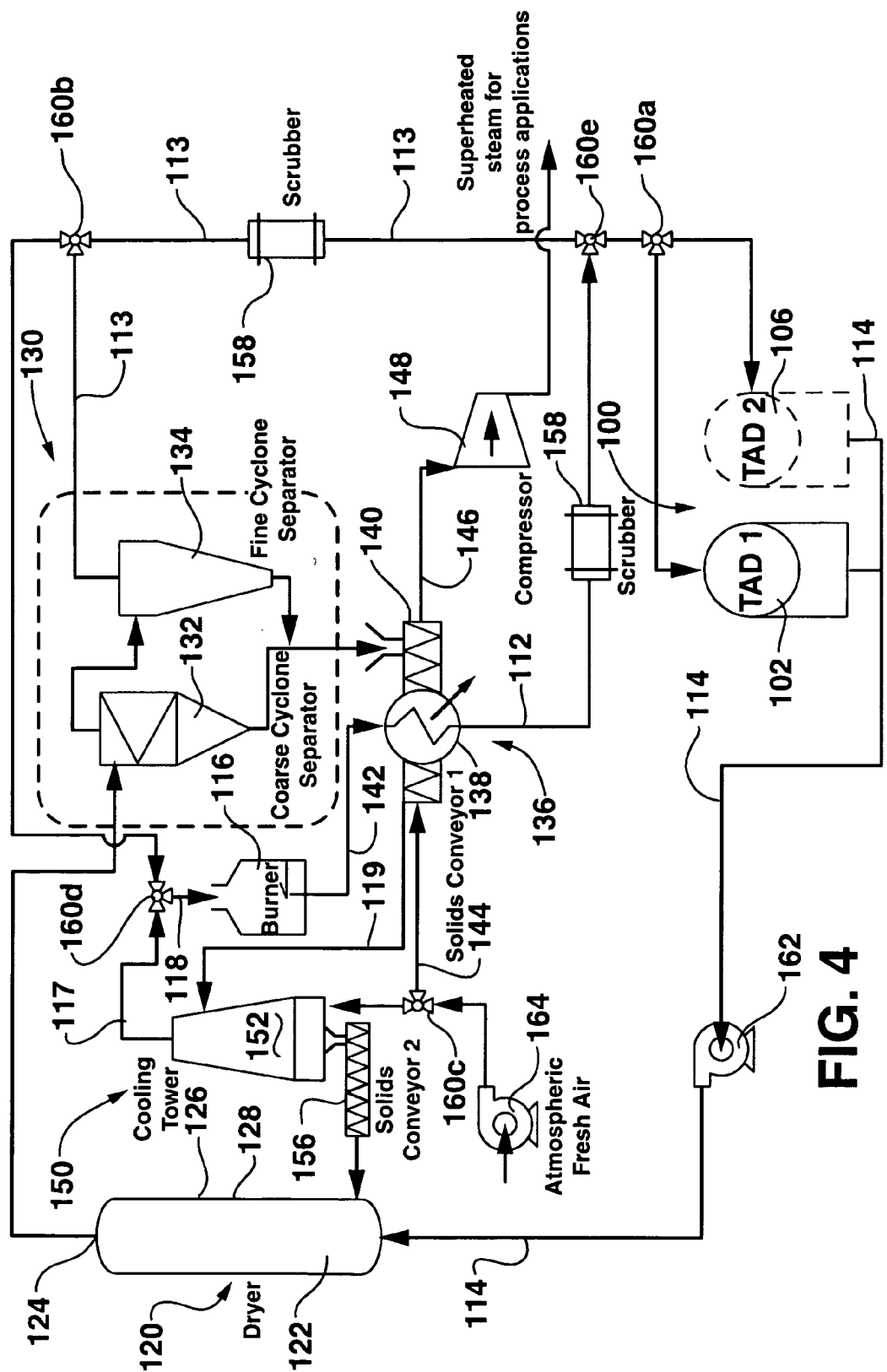
FIG. 4 is a more detailed schematic diagram of an alternate recirculation process for use in a throughdrying process line.

FIG. 4 is a more detailed schematic view of a particular embodiment of the system and method according to the invention. Referring to FIG. 4, from the throughair dryers 102, 106, the moisture laden exhaust air 114 is drawn by a recirculation fan 162 and conducted through the dryer 120 containing the moisture absorbing particles 128 and odor absorbing particles 126 in a fluidized bed 124, as discussed above. From the dryer 120, the exhaust stream 114 is conducted to the separating station 130, which has one or more known devices for separating particulates from an air stream. In the illustrated embodiment, the devices consist of one or more cyclone separators. For example, a coarse cyclone separator 132 may be disposed upstream from a fine cyclone separator 134. The coarse separator 132 removes relatively larger particles from the airstream, while a fine cyclone separator 134 removes the remaining smaller sized particles.

At least a portion of the dried exhaust stream 113 is directed via a valve 160*b* to the throughair dryers 102, 106. The exhaust stream 113 may pass through one or more inline conventional scrubber units 158. The exhaust stream 113 may be mixed with the heated drying medium 112 from the burner 116 via the mixing valve 160*e*. Downstream of the mixing valve 160*e*, a valve 160*a* may be incorporated to proportion the combined stream between the two throughair dryers 102, 106.

The drying particles 128 removed from the air stream 113 by way of the cyclone separators 132, 134, are regenerated and conveyed back to the dryer 120, as discussed above. For this purpose, the particles are first collected on a solids conveyor 140, which may be any conventional belt, auger, screw conveyor, or the like. The conveyor 140 conveys the particles through a heating device 136 wherein the particles are heated and any retained moisture is released from the particles. In the illustrated embodiment, the heating device 136 comprises a counter flow type of heat exchanger 138. This heat exchanger is provided with a heat source 142, which may be the heated drying medium 112 from the burner 116. The heat source or medium 142 passes through the heat exchanger in indirect contact with the particles 128. To remove the released moisture from the heat exchanger 138, a fresh air source 144 is directed through the heat exchanger 138 in direct contact with the particles 128. The air source 144 may be provided by a fresh air fan or blower unit 164. The air source 144 conveys the released moisture via an exhaust line 146 in the form of moisture laden exhaust air.

The heat source 142 conveyed through the heat exchange 138 may have a temperature of from about 250° to about 650° F., with a relative humidity of between about 10 percent to about 30 percent, and at a pressure of between about 0.8 to about 1.5 atmospheres. The cooling source 144 from the fan or blower 164 may have a temperature of between about 50° to about 100° F., a relative humidity of between about 30 percent to about 100 percent, and a pressure of between about 0.8 to about 1.5 atmospheres. The particles 128 conveyed through the heat exchanger 138 may have a temperature of between about 150° to about 550° F. and a moisture saturation of between about 15 percent to about 90 percent.

The moisture laden exhaust air from the heat exchanger 138 may be used in other process applications in the mill wherein steam or superheated steam is required. In this regard, a compressor 148 may be provided in-line to convert the moisture laden exhaust air 146 to saturated steam prior to being conducted to the other process applications.

As described above, the output from the burner 116 is the source of the heated drying medium 112, which may also serve as the heat source for the heat exchanger 138. Prior to being supplied to the intake of the throughair dryers 102, 106 via the mixing valve 160e, the heated drying medium 112 may pass through a conventional scrubber unit 158, as illustrated in FIG. 4.

After the drying particles 128 have been heated and dried as described above, they must be cooled prior to be reintroduced into the dryer 120. In this regard, the regeneration loop 135 may include a cooling device 150. The cooling device 150 may be any suitable type of heat exchanger, and is illustrated in FIG. 4 as a counter-flow heat exchanger supplied with cool air from the fresh air fan or blower 164 via the valve 160c. This air flows through a tower-like heat exchanger in counter-direction to the flow of the particles 128 supplied via path 119 by the solids conveyor 140. The air used to cool the particles 128 is heated and may be directed via line 117 to the burner 116 as part of the intake air 118 for the burner.

Once cooled, the particles 128 are removed from the heat exchanger 152 and conveyed via a second solids conveyor 156 back to the dryer 120.

The temperature of the particles 128 prior to being cooled in the heat exchanger 152 may range from 150° to about 550° F. After being cooled, the particles may have a temperature in the range of from about 50° to about 200° F.

As mentioned above with respect to FIGS. 2 and 3, a portion of the heated medium 113 exiting from the separating station 130 may be directed via valve 160b back to the burner 116 to serve as a portion of the intake air 118 for the burner 116 via valve 160b. This feature will also serve to reduce the load on the burner 116.

It should be appreciated by those skilled in the art that various configurations and arrangements of a throughdrying process may incorporate the features of the present invention, and that all such configurations are within the scope and spirit of the invention. It is intended that the invention include modifications and variations to the embodiments described herein, as set forth in the appended claims and their equivalents.

What is claimed is:

1. A throughdrying process for the manufacture of a tissue web, comprising:

conveying a moving fibrous web of cellulose fibers in a throughdrying system, including conveying the web through at least one throughair drying station;

supplying the throughair drying station with a heated drying medium from a source, the heated drying medium passing through and drying the fibrous web, the drying medium being conducted from the throughair drying station as moisture laden exhaust air;

collecting and drying the moisture laden exhaust air from the throughair drying station; and recirculating at least a portion of the dried exhaust air back to the throughair drying station as a supplement to the source of heated drying medium, thereby reducing the load on the heated drying medium source.

2. The process as in claim 1, wherein the throughair drying station includes a single throughair dryer.

3. The process as in claim 1, wherein the throughair drying station includes at least two serially arranged throughair dryers, the exhaust air being collected and recirculated from and to the serially arranged throughair dryers.

4. The process as in claim 1, wherein the exhaust air is dried by being conveyed through a fluidized bed of drying particles that absorb the moisture from the exhaust air.

5. The process as in claim 4, wherein odors are removed from the exhaust air as it is dried.

6. The process as in claim 5, wherein odor absorbing particles are mixed with the drying particles in the fluidized bed.

7. The process as in claim 4, wherein the heated drying medium is supplied from a fuel burning burner.

8. The process as in claim 7, wherein the recirculated dried exhaust air is mixed with the heated drying medium from the burner prior to being supplied to the throughair drying station.

9. The process as in claim 4, wherein the drying particles are removed from the recirculated dried exhaust air prior to the exhaust air being supplied to the throughair drying station.

10. The process as in claim 9, wherein the drying particles removed from the exhaust air are regenerated and recirculated back to the fluidized bed.

11. The process as in claim 10, wherein at least a portion of the heated drying medium is used to regenerate the drying particles by heating the particles in a heat exchanger prior to the drying medium being supplied to the throughair drying station.

12. The process as in claim 11, wherein the heated drying particles are cooled prior to being recirculated back to the fluidized bed.

13. The process as in claim 12, wherein the heated drying particles are cooled with a supply of atmospheric air, the heated atmospheric air from the cooling process in turn being supplied as intake air to the heated drying medium source.

14. The process as in claim 11, wherein the drying particles are also regenerated by direct contact with a supply of atmospheric air that adsorbs moisture from the heated drying particles.

15. The process as in claim 14, wherein the moisture laden atmospheric air from regeneration of the drying particles is conveyed away from said throughdrying system for other process applications.

16. The process as in claim 15, wherein the moisture laden atmospheric air from regeneration of the drying particles is compressed prior to use in the other process applications.

17. The process as in claim 1, further comprising removing odors from the dried exhaust air.

18. The process as in claim 17, wherein odors are removed by conveying the dried exhaust air through a fluidized bed of odor absorbing particles.

19. A throughdrying process for the manufacture of a tissue web, comprising:
conveying a moving fibrous web of cellulose fibers in a throughdrying system, including conveying the web through at least one throughair drying station;
supplying the throughair drying station with a heated drying medium from a burner, the heated drying medium passing through and drying the fibrous web and being conducted from the throughair drying station as moisture laden exhaust air;
conveying the moisture laden exhaust air from the throughair drying station through a drying bed of a moisture absorbing substrate;
recirculating at least a portion of the dried exhaust air back to the throughair drying station to supplement the heated drying medium from the burner; and
regenerating the moisture absorbing substrate with at least a portion of the heated drying medium from the burner.

20. The process as in claim 19, wherein the drying bed contains particles for the moisture absorbing substrate that are fluidized by passage of the moisture laden exhaust air therethrough.

21. The process as in claim 20, further comprising separating the particles of moisture absorbing substrate from the dried exhaust air prior to said regenerating step.

22. The process as in claim 19, wherein the moisture absorbing substrate is cooled with a supply of air after being heated by the heated drying medium.

23. The process as in claim 22, wherein the supply of air is heated by the process of cooling the moisture absorbing substrate, and is conveyed to an intake of the burner.

24. A throughdrying system for the manufacture of a tissue web, comprising:
a throughair drying station through which a moving fibrous web of cellulose fibers is conveyed;
a source configured to supply a heated drying medium to said throughair drying station that dries the web, said drying medium being exhausted from said throughair drying station as moisture laden exhaust air; and
a closed-loop recirculation path for at least a portion of said moisture laden exhaust air to be mixed with said heated drying medium, said recirculation path further comprising a dryer that removes moisture from said moisture laden exhaust air.

25. The system as in claim 24, wherein said throughair drying station comprises a single throughair dryer.

26. The system as in claim 24, wherein said throughair drying station comprises at least two serially arranged throughair dryers, moisture laden exhaust air being collected from and recirculated to said serially arranged throughair dryers.

27. The system as in claim 24, wherein said dryer comprises a fluidized bed of drying particles through which said moisture laden exhaust air is conveyed.

28. The system as in claim 27, wherein said fluidized bed further comprises odor absorbing particles.

29. The system as in claim 27, further comprising a separating station in said recirculation path downstream of said dryer and configured to remove said drying particles from said exhaust stream.

30. The system as in claim 29, wherein said separating station comprises at least one cyclone separator.

31. The system as in claim 30, wherein said separating station comprises a coarse cyclone separator and a fine cyclone separator.

32. The system as in claim 29, further comprising a regeneration loop configured to receive said drying particles from said separating station, said regeneration loop comprising a heating device through which said drying particles are conveyed and heated to release moisture therefrom, said regeneration loop returning said drying particles to said fluidized bed.

33. The system as in claim 32, wherein said heating device comprises a heat exchanger supplied with at least a portion of said heated drying medium.

34. The system as in claim 33, wherein said heat exchanger is also supplied with a source of atmospheric air that is conveyed in direct contact with said drying particles to remove moisture released therefrom.

35. The system as in claim 34, further comprising an exhaust line from said heat exchanger that directs moisture laden atmospheric air to other process applications.

36. The system as in claim 35, wherein said exhaust line comprises a compressor.

37. The system as in claim 32, wherein said regeneration loop further comprises a cooling device downstream of said heating device wherein said drying particles are cooled prior to being returned to said fluidized bed.

38. The system as in claim 37, wherein said cooling device comprises a heat exchanger supplied with atmospheric air.

39. The system as in claim 38, wherein heated atmospheric air from said cooling device is supplied as intake air to said heated drying medium source.

40. The system as in claim 24, wherein said heated drying medium source comprises a burner.

41. The system as in claim 40, wherein said recirculated dried exhaust air is mixed with said heated drying medium from said burner prior to being supplied to said throughair drying station.

* * * * *